United States Patent Office 3,527,748
Patented Sept. 8, 1970

3,527,748
5-ARYLAZO-PYRIMIDINE DYESTUFFS
Hans Ackermann, Werner Bossard, Jacques Voltz, and Hans Wegmuller, Riehen, Switzerland, assignors to J. R. Geigy A.G., Basel, Switzerland
No Drawing. Continuation-in-part of application Ser. No. 567,057, July 22, 1966. This application Nov. 8, 1967, Ser. No. 681,554
Claims priority, application Switzerland, Aug. 2, 1965, 10,857/65
Int. Cl. C09b *29/36;* D06p *1/02*
U.S. Cl. 260—154                          22 Claims

ABSTRACT OF THE DISCLOSURE

Dispersible dyestuffs which are 5-arylazo-pyrimidines wherein the carbon atoms in 2-, 4- and 6-positions of the pyrimidine ring are occupied by amino groups at least one of which is substituted by an unsubstituted or non-ionogenically substituted phenyl radical; such dyestuffs being distinguished by good affinity especially for polyester fibers, affording dyeings on these fibers which have excellent fastness properties; processes for dyeing polyester fibers with the aforesaid dyestuffs; and compositions containing polyester fiber material and such dyestuffs.

CROSS-REFERENCE TO RELATED APPLICATION

This application is a continuation-in-part of our pending patent application Ser. No. 567,057 filed on July 22, 1966.

DESCRIPTION OF THE INVENTION

The present invention concerns new, slightly to very slightly soluble azo dyestuffs which are water-dispersible, processes for the dyeing of hydrophobic organic fibers, especially textile fibers consisting of linear, high molecular esters of aromatic polycarboxylic acids with polyvalent alcohols or of cellulose esters, and as industrial product, dyed hydrophobic organic fibers attained with the new dyestuffs.

It has been found that valuable, water-dispersible, difficultly soluble azo dyestuffs are obtained by coupling the diazonium compound of an amine of Formula I

with a coupling component of Formula II

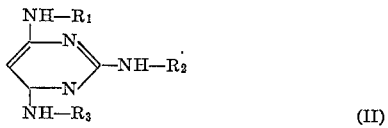

to form an azo dyestuff of Formula III

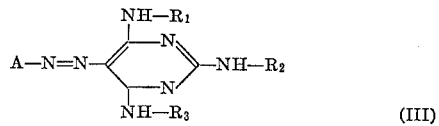

the components being so chosen that they contain no ionogenic, salt-forming groups.

In these formulae:

A represents a carboxylic or heterocyclic aryl radical which can contain non-ionogenic substitutents, including a phenyl azo group,
of $R_1$, $R_2$ and $R_3$ one R represents an unsubstituted or non-ionogenically substituted phenyl radical and each other R represents hydrogen or an unsubstituted or non-ionogenically substituted alkyl, cycloalkyl or phenalkyl group.

By ionogenic, salt-forming groups which are excluded as substitutents in the starting components of Formulae I and II and new dyestuffs of Formula III, are meant here and below the known, water solubilising substituents which dissociate acid in water and lend anionic character to the dyestuffs such as sulphonic acid, carboxylic acid, phosphonic acid groups, and onium groups which latter give a cationic character to the dyestuffs, e.g. the ammonium and sulphonium groups; thus rings and substituents defined as non-ionogenically substituted do not contain such groups.

When A represents a homocyclic aryl radical, this is mono- or poly-nuclear, condensed or uncondensed, particularly it is an unsubstituted or non-ionogenically substituted phenyl or naphthyl radical. Preferably A represents a phenyl radical which contains at least one non-ionogenic electron-attracting substituent in o- and/or p-position to the amino group and to the azo bond, respecitively. As electron-attracting, non-ionogenic substituents it can contain, e.g. the cyano, nitro, thiocyano or trifluoromethyl group; halogens such as fluorine, bromine or chlorine; acyl groups, especially carbacyl groups such as low alkanoyl or low alkenoyl groups, aroyl groups such as benzoyl groups or organosulphonyl groups such as low alkylsulphonyl or arylsulphonyl groups, further sulphonic acid aryl ester groups such as sulphonic acid phenyl, alkylphenyl or halogenphenyl ester groups; carboxylic acid ester groups, e.g. the carbophenoxy group, particularly however optionally non-ionogenically substituted carbalkoxy groups such as the carbomethoxy, carboethoxy, carboisopropoxy, carbobutoxy, methoxy-carboethoxy or chloro-carboethoxy group; sulphonic acid amide or carboxylic acid amide groups; N-mono or N-di- substituted carbamoyl or sulphamoyl groups having a phenyl group and/or having alkyl, hydroxyalkyl, alkoxyalkyl or benzyl substitutents. It is possible for all these groups to be furthere substituted non-ionogenically. In addition to the aforesaid preferred, electron-attracting substituents the radical A can also contain non-ionogenic, electron-releasing substituents, e.g. low alkyl groups or low alkyl groups mono-substituted, e.g. by a cyano, hydroxyl, low alkoxy group or by a halogen such as chlorine or bromine, optionally non-ionogenically substituted low alkoxy groups such as methoxy, ethoxy or ethoxy-carbonylmethoxy groups, phenoxy groups, alkyl- or halogen-substituted phenoxy groups, or acylamino groups, particularly carboacylamino groups, e.g. low alkanoylamino groups such as the acetylamino group, aroylamino groups such as the benzoylamino group, or low alkylsulphonylamino groups such as the methylsulphonylamino group, or arylsulphonylamino groups such as the phenylsulphonylamino group.

When A contains a phenyl azo group, then in an aromatic carbocycle, the azo group preferably takes the p-position. The phenyl azo group is preferably unsubstituted; however, it can also be substituted by halogens such as fluorine, chlorine or bromine, low alkyl, low alkoxy groups, or by the nitro group. When A is a phenylazophenyl radical then also the phenylene radical thereof can contain further substituents, e.g. low alkyl or low alkoxy groups, halogens such as fluorine, chlorine or bromine; preferably however, the phenylazophenyl-radical is unsubstituted.

If A is a naphthyl radical it can be an unsubstituted or a non-ionogenically substituted 1- or 2-naphthyl radical. Here, the principal substituents are low alkyl or low alkoxy groups, halogens such as chlorine or bromine, optionally N-substituted sulphonic acid amide groups, sulphonic acid aryl ester groups, low alkylsulphonyl groups or arylsulphonyl groups.

When A represents the radical of an aromatic heterocycle then it is principally the radical of a 5- or 6-membered heterocycle, preferably containing nitrogen, which belong, e.g. to the pyrazole, thiazole, oxydiazole, thiodiazole, triazole or pyridine series. It can also represent the radical of a polynuclear condensed heterocycle; this then preferably has a fused benzene ring, such as an optionally non-ionogenically substituted benzthiazole, indazole or quinoline ring. Also the fused benzene ring can be substituted by non-ionogenic substituents, especially by halogens, nitro, cyano, thiocyano, low alkyl, low alkoxy, low alkyl-sulphonyl, N-alkyl- or N,N-dialkyl-sulphamide groups.

In preferred dyestuffs of Formula III, A represents:

(a) a phenyl radical substituted by at least one non-ionogenic electron-attracting substituent in o- and/or p-position to the azo bond, or (b) a benzthiazolyl-(2) radical optionally substituted by chlorine, a nitro, rhodan, low alkyl, low alkoxy, low alkylsulphonyl or a N-low-alkyl or N,N-di-low-alkyl-sulphamide group, or (c) a 4-phenylazophenyl radical optionally substituted by a low alkyl group.

If each of $R_1$, $R_2$ and $R_3$ represents an alkyl radical, then this radical can contain 1 to 8 carbon atoms in a straight or branched chain. Preferably it has 1 to 5 carbon atoms. If this alkyl radical is substituted, then examples of substituents are the hydroxyl group or a low alkoxy group such as the methoxy group, the cyano group or halogens such as chlorine or bromine. As cycloalkyl or phenalkyl groups, $R_1$, $R_2$ and $R_3$ represent, e.g. the cyclohexyl or the benzyl group.

When $R_1$, $R_2$ or $R_3$ represents a phenyl radical, this can be non-ionogenically substituted, e.g. by the non-ionogenic substituents as hereinabove mentioned, especially by halogens such as fluorine, chlorine or bromine, cyano groups, low alkyl or low alkoxy groups, by the hydroxyl group, low alkyl sulphonyl groups, low alkyl-sulphonyloxy groups, low alkanoyl or low carbalkoxy groups, low alkanoylamino or low alkylsulphonylamino groups, unsubstituted sulphamyl or carbamyl groups, sulphamyl or carbamyl groups N-mono- or N,N-di-substituted by low alkyl, low hydroxyalkyl, low alkoxy-low alkyl or low cyanoalkyl groups.

In dyestuffs which are distinguished, among other things, by easy accessibility and high affinity to polyglycol terephthalate fibres and also by extraordinary stability in a boiling dyebath and which, in addition, are fast to sublimation IIa, the coupling components correspond to Formula IIa,

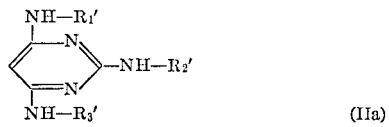

(IIa)

wherein of $R_1'$, $R_2'$ and $R_3'$ one R' represents an unsubstituted or non-ionogenically substituted phenyl radical, and the others are hydrogen or identical alkyl groups.

When one of the radicals $R_1'$, $R_2'$ and $R_3'$ is a non-ionogenically substituted phenyl radical, the preferred substituents are, e.g. halogens such as chlorine or bromine, low alkyl or alkoxy groups.

Azo dyestuffs according to the invention which are of the formula

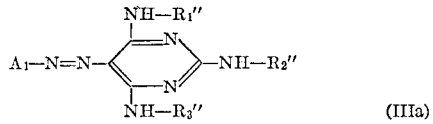

(IIIa)

wherein:

$A_1$ represents a phenyl radical, substituted by from 1 to 3 electron-attracting substituents, one of which is preferably in a position ortho or para, and preferably two of which are in positions ortho and para relative to the azo bridge, or $A_1$ represents a benzothiazolyl-(2) or a phenazophenyl radical as defined below, one of $R_1''$ and $R_2''$ represents phenyl substituted by hydrogen, lower alkyl, lower alkoxy, chlorine, bromine and/or cyano, and the other of the last-mentioned (R'')'s as well as $R_3''$ represents hydrogen, lower alkyl, cyclohexyl or benzyl; are of particularly high affinity for polyethylene glycol terephthalate fibers, and the dyeings obtained therewith on the latter fibers are of especially satisfactory fastness to light.

Of special importance because of their good accessibility are those monoazo dyestuffs of Formula IIIa wherein $A_1$ represents:

(a) A phenyl radical substituted as follows:

(i) by a first substituent selected from nitro, cyano, fluorine, chlorine, bromine, trifluoromethyl, lower alkanoyl, benzoyl, lower alkyl-sulfonyl, phenylsulfonyl, lower alkylphenylsulfonyl, phenoxysulfonyl, lower alkylphenoxysulfonyl, lower alkoxycarbonyl, hydroxy-lower alkoxycarbonyl, lower alkoxy-lower alkoxycarbonyl, or a substituent of the formula

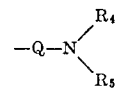

wherein Q represents —$SO_2$— or —CO—, $R_4$ represents hydrogen, lower alkyl, hydroxy-loweralkyl, lower alkoxy lower alkyl, phenyl, cyclohexyl or benzyl; and $R_5$ represents hydrogen, lower alkyl or hydroxy-lower alkyl;

(ii) by a second substituent selected from hydrogen, nitro, chlorine, bromine, lower alkyl, lower alkoxy and phenoxy; and (iii) by a third substituent selected from hydrogen, chlorine and bromine;

(b) A benzothiazolyl-(2) radical, designated in the appended claims as $A_2$, which is unsubstituted or substituted by chlorine, bromine, cyano, nitro, thiocyano, lower alkyl, lower alkoxy, lower alkylsulfonyl, or the grouping

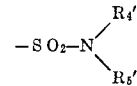

wherein $R_4'$ and $R_5'$ are preferably lower alkyl groups.

In a first preferred subclass of dyestuffs falling under Formula IIIa, one of the first and second substituents of a phenyl radical $A_1$ as defined under (a) supra is a nitro group which is preferably in o- and the second substituent in p-position to the adjoining azo bridge.

In this first preferred subclass $A_1$ represents a phenyl radical substituted as follows:

(a) By, as first substituent, a nitro group;

(b) By a second substituent selected from hydrogen, nitro, cyano, chlorine, bromine, lower alkyl, lower alkoxy, phenoxy, lower alkylsulfonyl, phenoxysulfonyl, lower alkylphenoxysulfonyl, lower alkoxycarbonyl, hydroxy-lower alkoxycarbonyl and a substituent of the formula

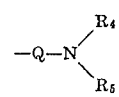

wherein Q represents —$SO_2$— or —CO—; $R_4$ represents hydrogen, lower alkyl, hydroxy-lower alkyl, lower alkoxy-lower alkyl, phenyl, benzyl or cyclohexyl; and $R_5$ represents hydrogen, lower alkyl or hydroxy-lower alkyl; and (c) By a third substituent selected from hydrogen, chloride or bromine.

Monoazo dyestuffs falling under Formula IIIa in which the diazo component $A_1$ is a phenyl radical free from nitro substituents, constitute a second important subclass of dyestuffs according to the invention; the substituents of the phenyl radical $A_1$ are then selected as follows:

(a) The first substituent from cyano, fluorine, chlorine, bromine, trifluoromethyl, lower alkanoyl, benzoyl, lower alkylsulfonyl, phenylsulfonyl, lower alkylphenylsulfonyl, phenoxysulfonyl, lower alkylphenoxysulfonyl, lower alkoxycarbonyl, lower alkoxy-lower alkoxycarbonyl and a substituent

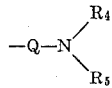

as defined hereinbefore, (b) The second substituent from hydrogen, lower alkyl, lower alkoxy, chlorine and bromine; and (c) The third substituent from the group defined above under (iii).

A more preferred subclass of dyestuffs according to the invention, due to their particularly good light fastness, are those in which $A_1$ represents 2-cyano-4-nitro-phenyl, 2-nitro-phenyl, 4-nitrophenyl, 2,4-dinitrophenyl, 2-chloro-4-nitro-phenyl, 2,4-dinitro-6-chloro-phenyl, 2-bromo-4-nitro-phenyl, 2,4-dinitro-6-bromo-phenyl, 2-nitro-4-chloro - phenyl, 2,6 - dichloro - 4 - nitro-phenyl, 2-nitro - 4 - methylsulfonyl - phenyl, and 2-nitro-4-ethylsulfonyl-phenyl, and similar groupings all of which fall under the formula

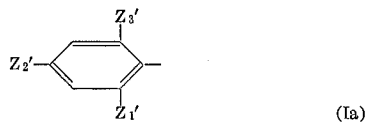

wherein $Z_1'$ represents nitro, cyano, chloro or bromo, $Z_2'$ represents nitro, chloro, bromo or alkyl-sulfonyl, and $Z_3'$ represents hydrogen, chloro or bromo.

More preferred because of especially good fastness properties of their dyeings on polyester fibers are those monoazo dyestuffs falling under Formula IIIa having the last-mentioned preferred substitution in the coupling component and, as diazo component the grouping of the formula

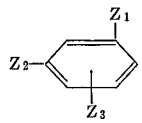

wherein one of $Z_1$ and $Z_2$ represents nitro, cyano, chloro or bromo, the other of these Z's represents nitro, chlorine, bromine or lower alkyl-sulfonyl, and when the first Z of this pair represents nitro, the other Z represents also hydrogen in addition to the aforesaid substituents, and $Z_3$ represents hydrogen, chlorine or bromine.

Most preferred are those dyestuffs having the last-defined meaning of $A_1$, which in their coupling component have no —$NH_2$ groups at the pyrimidine ring.

A preferred group of dyestuffs falling under the subclass of Formula IIIa, comprises dyestuffs of very good light fastness, which are of the formula

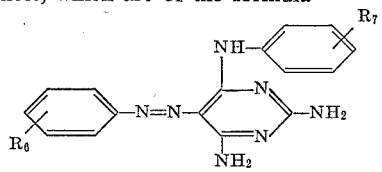

wherein $R_6$ represents cyano, fluorine, chlorine, bromine, lower alkoxycarbonyl, lower alkoxy, lower alkoxycarbonyl, chloro-lower alkoxycarbonyl, or a substituent of alkylphenoxysulfonyl, lower alkoxycarbonyl, hydroxy-lower alkoxycarbonyl, lower alkoxy, lower alkoxycarbonyl, chloro-lower alkoxycarbonyl, or a substituent of the formula

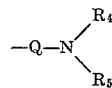

wherein Q, $R_4$ and $R_5$ have the same meanings as given hereinbefore, and $R_7$ represents hydrogen, lower alkyl or lower alkoxy.

Those dyestuffs falling under Formula IIIa which combine optimal properties of drawing power and buildup on polyester fibers with high light fastness and wet fastness of the resulting dyeings are the dyestuffs of the formula

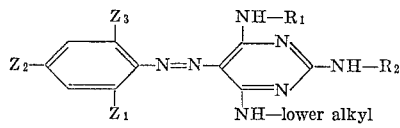

wherein one of $Z_1$ and $Z_2$ represents nitro and the other hydrogen, nitro, cyano, chlorine or bromine, $Z_3$ represents hydrogen, chlorine or bromine, and one of $R_1$ and $R_2$ represents phenyl substituted by substituents selected from hydrogen, lower alkyl and lower alkoxy, and the other represents lower alkyl.

Preferably $Z_2$ is nitro.

Disazo dyestuffs falling under Formula IIIa which are of special importance because of their good accessibility are those wherein $A_1$ represents 4-phenylazo-phenyl which is unsubstituted or substituted by lower alkyl or lower alkoxy.

Preferably, the coupling component of the aforesaid mono- and disazo dyestuffs of special importance comprises as substituents $R_1''$, $R_2''$ and $R_3''$ the following, one of $R_1''$ and $R_2''$ represents a phenyl radical, any substituent of which is selected from hydrogen, lower alkyl, and lower alkoxy, the other R'' of the pair of $R_1''$ and $R_2''$ represents hydrogen or lower alkyl, and $R_3''$ represents hydrogen or lower alkyl.

The term "lower" (or "low") as used in this specification and in the appended claims in connection with "alkyl" and "alkoxy" means that these radicals have from 1 to 5 carbon atoms; in connection with "alkonoyl" it means radicals of from 2 to 5 carbon atoms.

The coupling component of Formula II usable according to the invention are produced, e.g. by reacting a phenylaminodichloropyrimidine of Formula IV

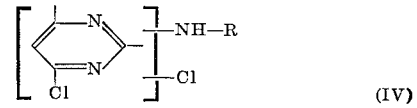

wherein R represents an unsubstituted or non-ionogenically substituted phenyl radical, with ammonia or with an optionally non-ionogenically substituted primary alkyl, cycloalkyl or phenalkyl amine, at a raised temperature. Preferably this reaction is performed at temperatures of 80–160° C. in a closed vessel. Phenylamino-dichloropyrimidines of Formula IV are obtained by known methods, e.g. by reacting 2,4,6-trichloropyrimidine with optionally non-ionogenically substituted phenylamines of the Formula R—$NH_2$.

The products resulting from the condensation are generally mixtures of isomers of 2-phenylamino-4,6-dichloropyrimidines and 4-phenylamino - 2,6 - dichloro-pyrimidines, which can be separated by fractional crystallization or chromatographic techniques.

The coupling of the diazonium compounds of an amine of Formula I with a coupling component of Formula II is performed by the usual methods, preferably in mineral acid to weakly acid aqueous medium, more especially at a pH of 4–4.5. When coupling in a mineral acid medium, the acid is advantageously gradually buffered, for example, with alkali metal salts or lower fatty acids. It is also possible to simultaneously couple a suitable diazonium compound with a mixture of isomeric coupling components usable according to the invention.

The dyestuffs according to the invention are finely dispersed by milling with surface active dispersing agents. Suitable dispersing agents are, e.g. anionic such as alkali metal salts of sec. higher alkylaryl sulfonates, alkali metal salts of condensation products of formaldehyde and naphthalene-sulfonic acids, lignin sulfonates, or non-ionogenic dispersing agents such as fatty alcohol polyglycol ethers.

When so prepared, the dyestuffs according to the invention are suitable principally for the dyeing of hydrophobic organic synthetic textile fibers from an aqueous dispersion, especially for the dyeing of textile fibers consisting of linear high molecular esters of aromatic polycarboxylic acids with polyfunctional alcohols, e.g. polyglycol terephthalate, polyglycol isophthalate or polycyclohexane diol terephthalate fibers or consisting of cellulose acetates, e.g. cellulose-2½ acetate or cellulose triacetate fibers.

The dyestuffs according to the invention can also be used for the dyeing of synthetic polyamide fibers such as nylon.

The dyeing of polyglycol terephthalate fibers with aqueous dispersions of the dyestuffs according to the invention is preferably performed at temperatures of over 100° C. under pressure above atmospheric. The dyeing can also be performed, however, at the boiling point of the dye liquor in the presence of carriers such as phenyl phenols, polychlorobenzene compounds or similar auxiliaries, or by a pad dyeing process followed by thermofixation at 180–220° C.

Dyestuffs according to the invention have good affinity for hydrophobic oragnic fibers, polyester fibers such as polyglycol terephthalate or cellulose acetate type fibers, preferably the former and, depending on their composition, produce on these fibers strongly colored greenish-yellow, yellow, orange, red or claret dyeings which have excellent fastness to washing, milling, sublimation, light crocking, perspiration, solvents, cross dyeing, decatising, gas fading and industrial fumes. Moreover, the dyestuffs according to the invention reserve animal and vegetable fibers well, particularly cotton and wool.

The dyestuffs according to the invention, especially their isomeric mixtures, differ from previously known dyestuffs of similar constitution by their very good drawing powers and build-up onto polyglycol terephthalate fibers. In addition, dyeing attained with the dyestuffs according to the invention have considerably better fastness to light and or sublimation.

Particularly valuable dyestuffs according to the invention having good fastness to sublimation and excellent fastness to light as well as very good drawing power and build up are derived from the isomeric mixtures of the formulae Va and Vb

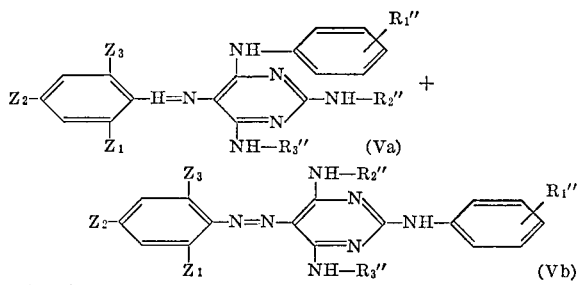

wherein:

$Z_1$ represents the nitro or cyano group, chlorine or bromine, $Z_2$ represents the nitro, methyl or ethylsulphonyl group, chlorine or bromine, $Z_3$ represents hydrogen, chlorine or bromine, $R_1''$ represents hydrogen or the methyl group and $R_2''$ and $R_3''$ are identical low alkyl radicals.

2,4-diamino - 5 - arylazo-6-hydroxy- and 6-amino-pyrimidines are known as dyes for acrylic fibers. However, these dyes either do not draw at all on polyester fibers especially of the polyterephthalate type, or, if they draw on these fibers, the resulting dyeings fail in important fastness properties that are required of such dyeings by the trade.

The deystuffs according to the invention are also suitable for the dyeing of cellulose acetates, polyglycol terephthalates and polyamides in the mass. Because of their good solubility in organic solvents such as acetone or chloroform, they can also be used in lacquers and printing inks.

The following examples illustrate the invention. The temperatures are given therein in degrees centigrade. "Polyglycol terephthalate" means the products known by the commercial names Terylene, Vycron, Dacron and Trevira.

Example 1

16.2 g. of 1-amino-2,4-dichlorobenzene are finely dispersed in 300 g. of water and 30 g. of 36% hydrochloric acid and the dispersion is diazotised at 0.5° by the addition of a solution of 6.9 g. of sodium nitrite in 50 g. of water. A solution of 20.1 g. of 2,6-bis-amino-4-phenyl-amino-pyrimidine in 500 g. of 40% acetic acid is added dropwise to the clear diazonium solution obtained. The pH of the reaction mixture is then buffered with sodium acetate to 4–4.5. The yellow coupling product, the composition of which corresponds to the formula

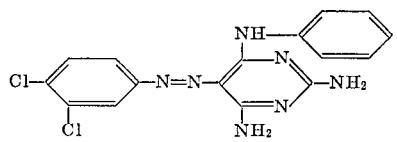

is filtered off, washed neutral with dilute sodium carbonate solution and finally washed free of salt with water. The dyestuff is dried in vacuo at 60–70° and then milled with a mixture of lignin sulphonate and the sodium salt of a condensation product of naphthalene-2-sulphonic-acid and formaldehyde. Pure yellow dyeings on polyethylene glycol terephthalate or cellulose triacetate fibres are attained with this dye preparation in aqueous dispersion, optionally in the presence of a carrier such as the sodium salt of o-phenylphenol. The dyeings have very good fastness to washing, rubbing, light and sublimation.

The 2,6-bis-amino-4-phenylamino-pyrimidine used in this example as coupling component is produced, e.g. by reacting 2,6-dichloro-4-phenylamino-pyrimidine with aqueous ammonia at 140–150°. The pure compound, obtained by crystallisation of the crude product from aqueous ethyl alcohol, melts at 162–163°.

Example 2

A fine suspension of 16.5 g. of 1-aminobenzene-4-carboxylic acid ethyl ester in 400 g. of water, 30 g. of 36% hydrochloric acid and 5 g. of cetyl polyglycol ether is diazotised in the usual way by the addition of 6.9 g. of sodium nitrite at 0–5°. The diazonium salt solution is clarified and added dropwise, at 5–10°, to a solution of 20.1 g. of 2,6-bis-amino-4-phenylamino-pyrimidine in 500 g. of 40% acetic acid. The pH of the mixture is then raised to 4–4.5 by the addition of sodium acetate. On completion of the coupling, the precipitated yellow precipitate, the composition of which corresponds to the formula

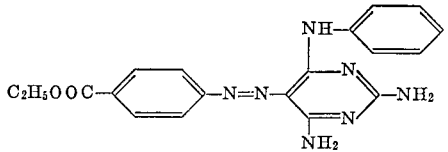

is filtered off, washed with a large amount of water and dried in vacuo at 60–70°. After milling with the sodium salt of a condensation product of naphthalene-2-sulphonic acid and formaldehyde, the dyestuff obtained dyes polyglycol terephthalate fibres from an aqueous dispersion, optionally in the presence of a carrier such as the sodium salt of o-phenylphenol, in pure yellow shades. The dye bath is substantially exhausted. The dyeings have very good fastness to washing, rubbing, light and sublimation. Also closely woven fabric or tightly twisted yarns are well and evenly penetrated.

Dyestuffs having similar properties are obtained if the diazo components given in column 2 of the following Table I are coupled under the conditions described in the above Example 2 with the equimolar amount of one of the coupling components given in column 3.

is filtered off, washed with a large amount of water and then dried in vacuo as usual at 60–70°. 5 g. of the dyestuff so obtained are brought into a finely dispersible form by milling with 15 g. of a lignin sulphonate.

TABLE I

| Example No. | Diazo component | Coupling component | Shade on polyglycol terephthalate fibres |
|---|---|---|---|
| 3 | 1-amino-2-chlorobenzene | 2,6-bis-amino-4-phenylamino-pyrimidine | Greenish yellow. |
| 4 | 1-amino-4-chlorobenzene | do | Do. |
| 5 | 1-amino-2-4-di-bromobenzene | do | Yellow. |
| 6 | 1-amino-4-fluorobenzene | do | Do. |
| 7 | 1-amino-2-cyanobenzene | do | Do. |
| 8 | 1-amino-3-trifluoromethylbenzene | do | Greenish yellow. |
| 9 | 1-amino-2-nitrobenzene | do | Orange. |
| 10 | 1-amino-2-nitro-4-methylbenzene | do | Do. |
| 11 | 1-amino-2-nitro-4-methoxybenzene | do | Scarlet. |
| 12 | 1-amino-2-nitro-4-chlorobenzene | do | Orange. |
| 13 | 1-amino-2,4-dinitrobenzene | do | Do. |
| 14 | 1-amino-2-cyano-4-nitrobenzene | do | Do. |
| 15 | 1-amino-2-bromo-4-nitrobenzene | do | Do. |
| 16 | 1-amino-2,4-dinitro-6-chlorobenzene | do | Do. |
| 17 | 1-amino-4-acetylbenzene | do | Greenish yellow. |
| 18 | do | 2,6-bis-amino-4-(2'-methyl-phenylamino)-pyrimidine | Do. |
| 19 | 1-amino-4-benzoylbenzene | do | Do. |
| 20 | do | 2,6-bis-amino-4-phenylamino-pyrimidine | Do. |
| 21 | 1-aminobenzene-2-carboxylic acid ethyl ester | do | Yellow. |
| 22 | 1-aminobenzene-4-carboxylic acid butyl ester | do | Do. |
| 23 | 1-aminobenzene-4-carboxylic acid-β-methoxyethyl ester | do | Do. |
| 24 | do | 2,6-bis-amino-4-(4'-chlorophenyl-amino)-pyrimidine | Do. |
| 25 | 1-aminobenzene-2-carboxylic acid-N-methylamide | do | Do. |
| 26 | 1-aminobenzene-4-carboxylic acid-N-methyl-N-β-hydroxyethylamide. | do | Do. |
| 27 | 1-aminobenzene-3-sulphonic acid-N-ethylamide | 2,6-bis-amino-4-phenylaminopyrimidine | Do. |
| 28 | 1-aminobenzene-4-sulphonic acid phenyl ester | do | Do. |
| 29 | 1-amino-4-methyl-sulphonylbenzene | do | Do. |
| 30 | do | 2,6-bis-amino-4-(2'-methoxyphenyl-amino)-pyrimidine | Do. |
| 31 | 1-amino-2-nitro-4-methylsulphonylbenzene | do | Orange. |
| 32 | 1-amino-4-ethoxycarbonylmethoxybenzene | 2,6-bis-amino-4-(2'-bromophenyl-amino)-pyrimidine | Yellow. |
| 33 | 1-aminonaphthalene | 2,6-bis-amino-4-phenylaminopyrimidine | Reddish yellow. |
| 34 | 2-aminonaphthalene | do | Do. |
| 35 | 1-amino-4-phenylsulphonylbenzene | do | Yellow. |
| 36 | 1-amino-4-acetylaminobenzene | do | Do. |
| 37 | 1-amino-benzene-2-sulfonic acid N,N-diethyl-amide | do | Do. |

Example 38

18.3 g. of 1-amino-2,4-dinitrobenzene are dissolved in 100 g. of concentrated sulphuric acid and the solution is diazotised at 20–25° with the amount of nitrosyl sulphuric acid corresponding to 6.9 g. of sodium nitrite. The diazonium salt solution obtained is added dropwise at 0–5° to a solution of 22.9 g. of 2,6-bis-methylamino-4-phenylamino-pyrimidine in 250 g. of 80% acetic acid and 200 g. of water. On completion of the coupling, the red-brown precipitate formed, the composition of which corresponds to the formula

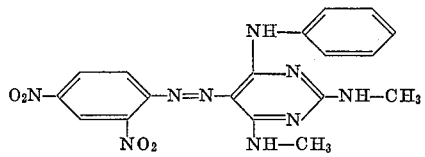

Polyglycol terephthalate fibres dyed in clear red shades are obtained with this dye preparation in aqueous dispersion, optionally in the presence of a carrier such as the sodium salt of o-phenylphenol. The dyeings have very good fastness to washing, rubbing, light and sublimation.

The 2,6-bis-methylamine-4-phenylamino-pyrimidine used in the above Example 38 as coupling component is obtained, e.g., by reacting 2,6-dichloro-4-phenylamino-pyrimidine with aqueous methylamine at 140–150°.

Dyestuffs having similar good properties are obtained if a diazo component given in column 2 of the following Table II is coupled with one of the coupling components given in column 3 under the conditions described in the Example 38.

TABLE II

| Example No. | Diazo component | Coupling component | Shade on polyglycol terephthalate fibres |
|---|---|---|---|
| 39 | 1-amino-2-chlorobenzene | 2,6-bis-n-propylamino-4-phenylamino-pyrimidine | Yellow. |
| 40 | do | 2,6-bis-(β-hydroxy-ethylamino)-4-phenylaminopyrimidine | Do. |
| 41 | 1-amino-2,4-dichlorobenzene | 2,6-bis-n-butylamino-4-phenylamino-pyrimidine | Reddish yellow. |
| 42 | do | 2,6-bis-(γ-methoxypropylamino)-4-phenylaminopyrimidine | Do. |
| 43 | 1-amino-2,5-dichlorobenzene | 2,6-bis-isopropylamino-4-phenylamino-pyrimidine | Do. |
| 44 | 1-amino-4-acetylbenzene | 2,6-bis-ethylamino-4-(3'-methylphenylamino)pyrimidine | Do. |
| 45 | 1-aminobenzene-4-carboxylic acid methyl ester | do | Do. |
| 46 | 1-aminobenzene-4-carboxylic acid-β-chloroethyl ester | 2,6-bis-ethylamino-4-phenylamino-pyrimidine | do. |
| 47 | 1-amino-4-nitrobenzene | 2,6-bis-cyclohexylamino-4-phenylamino-pyrimidine | Yellowish scarlet. |
| 48 | 1-amino-2-nitro-4-methylsulphonylbenzene | 2,6-bis(β-chloroethylamino)-4-phenylaminopyrimidine | Scarlet. |
| 49 | 1-amino-2-nitrobenzene | 2-amino-4-phenylamino-6-γ-methoxypropylaminopyrimidine. | Orange. |
| 50 | 1-amino-2-chloro-4-nitrobenzene | 2,6-bis-benzylamino-4-phenylaminopyrimidine | Yellowish-scarlet. |
| 51 | 1-amino-2-cyano-4-nitrobenzene | 2,6-bis-ethylamino-4-phenylaminopyrimidine | Scarlet. |
| 52 | 1-amino-2,4-dinitrobenzene | do | Red. |
| 53 | 1-amino-2,4-dinitro-6-chlorobenzene | do | Red. |
| 54 | 1-amino-4-nitro-2-methoxybenzene | 2,6-bis-propylamino-4-(3'-hydroxyphenylamino)pyrimidine. | Red. |
| 55 | 1-amino-2-nitro-4-ethoxybenzene | 2-benzylamino-4-phenylamino-6-aminopyrimidine | Brown red. |
| 56 | 1-amino-2-nitro-4-phenoxybenzene | 2,6-bis-(γ-methy-propylamino)-4-(4'-bromophenylamino) pyrimidine. | Do. |
| 57 | 1-amino-2-nitro-4-ethylsulphonylbenzene | 2,6-bis-ethylamino-4-phenylamino-pyrimidine | Yellowish scarlet. |
| 58 | do | 2,6-bis-propylamino-4-phenylaminopyrimidine | Do. |

Example 59

A fine suspension of 19.7 g. of 4-amino-azobenzene in 500 g. of water, 75 g. of 36% hydrochloric acid and 5 g. of oleyl polyglycol ether is diazotised in the usual way at 15–20° by the addition of 6.9 g. of sodium nitrite. The clarified diazonium salt solution is added dropwise at 0–5° to a solution of 27.1 g. of 2,6-bis-ethylamino-4-(4'-methyl-phenylamino)-pyrimidine in 200 g. of water and 350 g. of 80% acetic acid. The pH of the coupling mixture is then adjusted to 4.5–5 by the addition of sodium acetate. To complete the coupling, the reaction mixture is stirred for 10 hours at 5–10°. The red precipitate formed, the composition of which corresponds to the formula

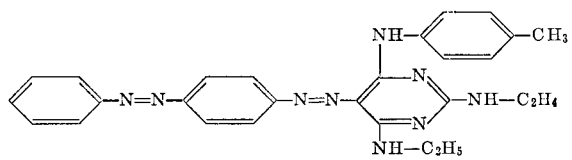

is filtered off, washed with water and dried in the usual way. 5 g. of the dyestuff obtained in this way are brought into a finely dispersed form by milling with 12 g. of sodium salt of a condensation product of naphthalene-2-sulphonic acid and formaldehyde. With this dye preparation in aqueous dispersion, optionally in the presence of a carrier such as sodium-o-phenyl-phenolate, polyglycol terephthalate fibres dyed in pure scarlet shades are obtained. The dyeings have very good fastness to perspiration, rubbing and sublimation.

The 2,6-bis-ethylamino-4-(4'-methyl-phenylamino)-pyrimidine used in this example as coupling component is obtained by the known method, e.g., by reacting 2,6-dichloro-4-(4'-methyl-phenylamino)-pyrimidine with aqueous ethylamine at 140–150°.

Dyestuffs having similar properties are obtained if a diazo component given in column 2 of the following Table III is coupled under the conditions described in the Example 59 with one of the coupling components given in column 3.

Example 66

18 g. of 2-amino-6-methoxy-benzothiazole in 100 g. of concentrated sulphuric acid are diazotised for 3 hours at −5° with nitrosyl sulphuric acid, corresponding to 6.9 g. of sodium nitrite. The diazonium salt solution so obtained is added dropwise at 0–5° to a solution of 23.5 g. of 2,6-bis-amino-4-(3'-chlorophenylamino)-pyrimidine in 600 g. of water and 400 g. of 80% acetic acid. The free mineral acid is then buffered by the addition of sodium acetate. On completion of the coupling, the scarlet precipitate formed is filtered off, washed neutral with dilute sodium carbonate solution and then washed free of salt with water. The dried dyestuff, the composition of which corresponds to the formula is an orange coloured powder. A preparation produced by milling it with a lignin sulphonate—when in aqueous dispersion optionally in the presence of a carrier such as the sodium salt of o-phenyl-phenol, dyes polygol terephthalate fibres in pure orange shades. The dyeings have very good fastness to washing, perspiration, rubbing and sublimation.

The 2,6-bis-amino-4-(3'-chlorophenylamino)-pyrimidine used in the above example as starting material is obtained, e.g. by reacting 2,6-dichloro-4-(3'-chlorophenylamino)-pyrimidine with aqueous ammonia at 140–150°.

If, in the above example, the 18 g. of 2-amino-6-methoxybenzthiazole are replaced by a corresponding amount of one of the diazo components given in column 2 of the following Table IV and this is coupled under the conditions described with one of the coupling components given in column 3, then dyestuffs are obtained the dyeings of which have similar good properties on polyglycol terephthalate fibres.

TABLE III

| Example No. | Diazo component | Coupling component | Shade on polyglycol terephthalate fibres |
|---|---|---|---|
| 60 | 4-amino-azobenzene | 2,6-bis-methylamino-4-phenylamino-pyrimidine | Scarlet. |
| 61 | 4-amino-2',3-dimethyl-azobenzene | do | Do. |
| 62 | do | 2,6-bis-amino-4-phenyl-amino-pyrimidine | Orange. |
| 63 | 4-amino-4'-chloro-2-methyl-azobenzene | do | Do. |
| 64 | 4-amino-azobenzene | 2,6-bis-ethylamino-4-phenylamino-pyrimidine | Scarlet. |
| 65 | do | 2,6-bis-(γ-methoxypropylamino)-4-phenylamino-pyrimidine | Do. |

TABLE IV

| Example No. | Diazo component | Coupling component | Shade on polyglycol terephthalate fibres |
|---|---|---|---|
| 67 | 2-amino-5-nitro-thiazole | 2,6-bis-amino-4-phenylamino-pyrimidine | Scarlet. |
| 68 | do | 2,6-bis-ethylamino-4-phenylamino-pyrimidine | Red. |
| 69 | 2-aminobenzthiazole | 2,6-bis-amino-4-phenylamino-pyrimidine | Yellowish orange. |
| 70 | 2-amino-6-methoxy-benzthiazole | do | Orange. |
| 71 | do | 2,6-bis-methylamino-4-phenylamino-pyrimidine | Scarlet. |
| 72 | 2-amino-6-rhodanbenzthiazole | do | Red. |
| 73 | do | 2,6-bis-amino-4-(4'-methylphenylamino)-pyrimidine | Scarlet. |
| 74 | 2-amino-6-cyanobenzthiazole | 2,6-bis-amino-4-phenylamino-pyrimidine | Do. |
| 75 | 2-amino-6-methylsulphonyl-benzthiazole | do | Orange. |
| 76 | do | 2,6-bis-(γ-methoxypropylamino)-4-phenylamino-pyrimidine. | Scarlet. |
| 77 | 2-amino-benzthiazole-6-sulphonic acid-N,N-diethylamide | do | Do. |
| 78 | 2-amino-6-chlorobenzthiazole | do | Do. |
| 79 | 2-amino-6-methoxybenzthiazole | 2,6-bis-methylamino-4-(4'-cyano-phenylamino)-pyrimidine. | Do. |
| 80 | 2-amino-6-ethoxybenzthiazole | do | Do. |
| 81 | 2-amino-benzthiazole | 2,6-bis-n-propylamino-4-phenylamino-pyrimidine | Orange. |
| 82 | 1-amino-4-nitrobenzene | 2,6-bis-ethylamino-4-(2'-cyano-phenylamino)-pyrimidine. | Do. |
| 83 | do | 2,6-bis-isopropylamino-4-(2'-carbamyl-phenylamino)-pyrimidine. | Do. |
| 84 | 1-amino-benzene-4-carboxylic acid ethylester | 2,6-bis-methylamino-4-(2'-N-methyl-carbamidphenyl-amino)-pyrimidine. | Reddish yellow. |

TABLE—Continued

| Example No. | Diazo component | Coupling component | Shade on polyglycol terephthalate fibres |
|---|---|---|---|
| 85 | do | 2,6-bis-ethylamino-4-(2'-N-methyl-N-β-hydroxyethyl-carbamid-phenylamino)-pyrimidine. | Do. |
| 86 | 1-amino-2-cyanobenzene | 2,6-bis-amino-4-(4'-carboethoxy-phenylamino)-pyrimidine. | Yellow. |
| 87 | 1-amino-2-chlorobenzene | 2,6-bis-propylamino-4-(3'-methylsulphonyl-phenylamino)-pyrimidine. | Do. |
| 88 | 1-amino-2,4-dichlorobenzene | 2,6-bis-methylamino-4-(3'-ethylsulphonyl-phenylamino)-pyrimidine. | Do. |
| 89 | 1-amino-benzene-4-carboxylic acid-ethylester | 2,6-bis-amino-4-(4'-sulphamyl-phenylamino)-pyrimidine. | Do. |
| 90 | 1-amino-benzene-4-sulphonic acid-(4'-methylphenyl)-ester | 2,6-bis-methylamino-4-(4'-methyl-sulphamidphenyl-amino)-pyrimidine. | Reddish yellow. |
| 91 | 1-amino-4-nitrobenzene-2-carboxylic acid-isopropylester | 2,6-bis-amino-4-(4'-N-methyl-N-β-hydroxyethylsulph-amid-phenylamino)-pyrimidine. | Orange. |
| 92 | 1-amino-4-benzoylamino-benzene | 2,6-bis-ethylamino-4-(3'-acetylamino-phenylamino)-pyrimidine. | Reddish yellow. |
| 93 | 1-amino-2,4-dinitrobenzene | 2,6-bis-amino-4-(3'-methyl-sulphonylaminophenylamino)-pyrimidine. | Orange. |
| 94 | 1-amino-2,4-dinitro-6-bromobenzene | 2,6-bis-methylamino-4-(3'-methylsulphonyloxyphenyl-amino)-pyrimidine. | Red. |

Example 95

18.3 g. of 1-amino-2,4-dinitrobenzene are dissolved in 100 g. of concentrated sulphuric acid and the solution is diazotised at 20–25° with the amount of nitrosyl sulphuric acid corresponding to 6.9 g. of sodium nitrite. The diazonium salt solution so obtained is added dropwise at 0–5° to a solution of 27.1 g. of 4,6-bis-ethylamino-2-(4'-methyl-phenylamino)-pyrimidine in 300 g. of 80% acetic acid and 200 g. of water. The pH of the coupling mixture is then adjusted to 4–5 by the addition of sodium acetate. The dark red coupling product, the composition of which corresponds to the formula

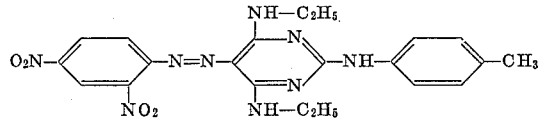

is filtered off, washed with water and dried at 70–80° in vacuo. 10 g. of the dyestuff so obtained are finely dispersed by milling with 30 g. of a lignin sulphonate. Polyglycol terephthalate fibres can be dyed in pure red shades with this dye preparation from an aqueous dispersion, optionally in the presence of a carrier such as sodium-o-phenyl phenolate. The dyeings have very good fastness to washing, perspiration, rubbing, sublimation and light.

The 4,6-bis-ethylamino-2-(4'-methyl-phenylamino)-pyrimidine used in this example as coupling component is obtained, e.g. by reacting 4,6-dichloro-2-(4'-methyl-phenylamino)-pyrimidine with aqueous ethylamine at 150–160°.

Dyestuffs having similar properties are obtained if the diazo components given in column 2 of the following Table V are coupled under the conditions given in the above example with the coupling components given in column 3 of the same table.

TABLE V

| Example No. | Diazo component | Coupling component | Shade on polyglycol terephthalate fibres |
|---|---|---|---|
| 96 | 1-amino-2-nitrobenzene | 4,6-bis-amino-2-phenylamino-pyrimidine | Yellowish orange. |
| 97 | 1-amino-2-nitro-4-methylbenzene | do | Orange. |
| 98 | 1-amino-2-chloro-4-nitrobenzene | 4,6-bis-ethylamino-2-phenylamino-pyrimidine | Scarlet. |
| 99 | 1-amino-2-cyano-4-nitrobenzene | do | Do. |
| 100 | 1-amino-2-nitrobenzene-4-methylsulphone | 4,6-bis-methylamino-2-(2'-methyl-phenylamino)-pyrimidine. | Do. |
| 101 | 1-amino-4-nitrobenzene-2-carboxylic acid-methylamide | 4,6-bis-isopropylamino-2-(2'-chloro-phenylamino)-pyrimidine. | Do. |
| 102 | 1-amino-2-nitrobenzene-4-carboxylic acid-N-methyl-N-β-hydroxy-ethylamide. | do | Do. |
| 103 | 1-aminobenzene-4-carboxylic acid-phenylamide | 4,6-bis-amylamino-2-(3'-acetylamino-phenylamino-pyrimidine. | Reddish yellow. |

Example 104

18 g. of 2-amino-6-methoxy-benzothiazole in 100 g. of concentrated sulphuric acid are diazotised at −5° with nitrosyl sulphuric acid, corresponding to 6.9 g. of sodium nitrite. This diazonium salt solution is added dropwise at 0–5° to a solution of 28.5 g. of 4,6-bis-propylamino-2-phenylamino-pyrimidine in 450 g. of 40% acetic acid. The pH of the coupling mixture is then raised to 4–4.5 by the addition of sodium acetate. On completion of the coupling, the precipitated red coupling product, the composition of which corresponds to the formula

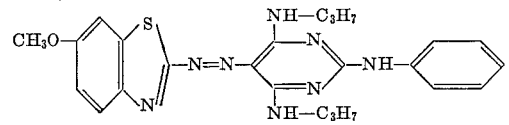

is filtered off, washed with water and then dried at 70–80° in vacuo. After milling with the sodium salt of the condensation product of naphthalene-2-sulphonic acid and formaldehyde, the dyestuff so obtained dyes polyglycol-terephthalte fibres from an aqueous dispersion, optionally in the presence of a carrier such as trichlorobenzene, in pure scarlet shades. The dyebath is substantially exhausted. The dyeings have very good fastness to washing, rubbing, light and sublimation.

Dyestuffs having similar properties are obtained if the diazo components given in column 2 of the following Table VI are coupled under the conditions described in the above Example with the equivalent amounts of the coupling components given in column 3 of the same table.

TABLE VI

| Example No. | Diazo component | Coupling component | Shade on polyglycol-terephthalate fibres |
|---|---|---|---|
| 105 | 2-amino-5-nitro-thiazole | 4,6-bis-isopropylamino-2-phenylamino-pyrimidine | Red. |
| 106 | 3-amino-5-nitro-indazole | do | Orange. |
| 107 | 5-amino-1-phenyl-3-methyl-pyrazole | 4,6-bis-amino-2-(2'-methoxy-phenylamino)-pyrimidine | Yellow. |
| 108 | 4-amino-quinoline | do | Scarlet. |
| 109 | 4-amino-azobenzene | 4,6-bis-methylamino-2-(4'-chlorophenylamino)pyrimidine | Do. |
| 110 | 4-amino-2',3-dimethyl-azobenzene | do | Do. |

Example 111

21.8 g. of 1-amino-2,4-dinitro-6-chlorobenzene are dissolved in 200 g. of concentrated sulphuric acid and the solution is diazotised at 20–30° with the amount of nitrosyl sulphuric acid corresponding to 6.9 g. of sodium nitrite. The diazonium salt solution so obtained is added dropwise at 0–5° to a solution of a mixture consisting of 22.4 g. of 2,6-bis - ethylamino-4-phenylamino-pyrimidine and 3.3 g. of 4,6-bis-ethylamino-2-phenylamino-pyrimidine in 400 g. of 80% acetic acid and 300 g. of water. On completion of the coupling, the precipitated dark red coupling product, the composition of which corresponds to the formulae

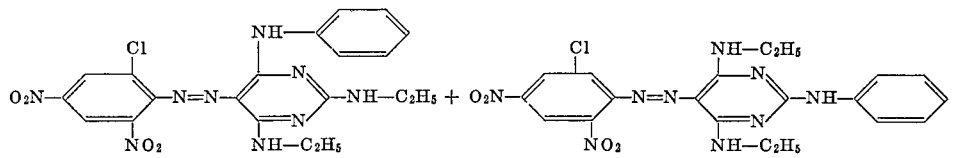

is filtered off, washed with water and dried in the usual way. 10 g. of the mixture of dyestuffs so obtained are brought into a finely dispersable form by milling with 20 g. of a lignin sulphonate.

Polyglycol terephthalate fibres and cellulose triacetate fibres can be dyed in pure red shades with this dye preparation from an aqueous bath, optionally in the presence of a carrier such the sodium salt of o-phenylphenol. The dyeings have very good fastness to washing, perspiration, rubbing, sublimation and light.

The mixture consisting of 4,6-bis-ethylamino-2-phenylamino-pyrimidine and 2,6-bis-ethylamino-4-phenylamino-pyrimidine used in this example as coupling component is obtained, e.g. by condensation of 2,4,6-trichloro-pyrimidine with one equivalent of aniline and subsequent reaction of the condensation products with at least four equivalents of diethylamine at 150–155°.

Dyestuffs having similar properties are obtained when the equivalent amount of any one of the diazo components given in column 2 of the following Table VII is coupled with any of the mixtures of coupling components given in column 3 of the same table.

TABLE VII

| Example No. | Diazo component | Coupling component | Shade on polyglycolterephthalate fibres |
|---|---|---|---|
| 112 | 1-amino-2,4-dinitro-benzene | 22.4 g. 2,6-bis-ethylamino-4-phenylamino pyrimidine<br>3.3 g. 4,6-bis-ethylamino-2-phenylamino pyrimidine | Red. |
| 113 | 1-amino-2-cyano-4-nitro-benzene | Same as above | Scarlet. |
| 114 | 1-amino-2,6-dichloro-4-nitrobenzene | do | Do. |
| 115 | 1-amino-2-nitrobenzene | do | Orange. |
| 116 | 1-amino-4-nitrobenzene | do | Do. |
| 117 | 1-amino-4-nitrobenzene-2-carboxylic acid-ethylester | do | Scarlet. |
| 118 | 1-amino-2-nitrobenzene-4-carboxylic acid-amide | do | Do. |
| 119 | 1-amino-4-nitrobenzene-2-carboxylic acid-methylamide | do | Do. |
| 120 | 1-amino-4-nitrobenzene-2-carboxylic acid-dimethylamide | do | Do. |
| 121 | 1-amino-2-nitrobenzene-4-carboxylic acid-β-hydroxyethylamide | do | Do. |
| 122 | 1-amino-2-nitrobenzene-4-carboxylic acid-butylester | do | Do. |
| 123 | 1-amino-2-nitrobenzene-4-carboxylic acid-N-methyl-N-phenylamide | do | Do. |
| 124 | 1-amino-2-nitrobenzene-4-sulphonic acid-N-methyl-N-β-hydroxyethylamide | do | Do. |
| 125 | 1-amino-2-nitrobenzene-4-sulphonic acid-4'-methylphenylester | do | Do. |
| 126 | 1-amino-2-nitro-4-methylsulphonyl-benzene | do | Do. |
| 127 | do | 17.5 g. 2,6-bis-amino-4-phenylaminopyrimidine<br>2.6 g. 4,6-bis-amino-2-phenylaminopyrimidine | Orange. |
| 128 | 1-amino-2-nitrobenzene-4-sulphonic acid-amide | 25 g. 2,6-bis-n-propylamino-4-phenylamino-pyrimidine<br>3.5 g. 4,6-bis-n-propylamino-2-phenylamino-pyrimidine | Scarlet. |
| 129 | 1-amino-2-nitro-benzene-4-sulphonic acid-methylamide | 27 g. 2,6-bis-butylamino-4-phenylaminopyrimidine<br>4.1 g. 4,6-bis-butylamino-2-phenylaminopyrimidine | Do. |
| 130 | 1-amino-2-nitrobenzene-4-sulphonic acid-γ-methoxy-propyl-amide | 30 g. 2,6-bis-isoamyl-amino-4-phenylaminopyrimidine<br>4.1 g. 4,6-bis-isoamyl-amino-2-phenylamino-pyrimidine | Do. |
| 131 | 1-aminobenzene-4-carboxylic acid ethylester | 38 g. 2,6-bis-n-octyl-amino-4-phenylaminopyrimidine<br>4.5 g. 4,6-bis-n-octyl-amino-4-phenylaminopyrimidine | Reddish yellow. |
| 132 | 1-aminobenzene-4-sulphonic acid-γ-methoxy-propylamide | 16.6 g. 2,6-bis-amino-4-(2'-methylphenylamino)-pyrimidine<br>5 g. 4,6-bis-amino-2-(2'-methylphenylamino)-pyrimidine | Do. |
| 133 | 1-aminobenzene-4-sulphonic acid-N-methyl-N-phenylamide | 23 g. 2,6-bis-β-hydroxyethylamino-4-(2'-methylphenylamino)-pyrimidine<br>7.3 g. 4,6-bis-β-hydroxyethylamino-2-(2'-methylphenylamino)-pyrimidine | Do. |
| 134 | 1-amino-4-methyl-sulphonylamino-benzene | 27 g. 2,6-bis-γ-methoxypropylamino-4-(2'-methylphenylamino)-pyrimidine<br>9 g. 4,6-bis-γ-methoxypropylamino-2-(2'-methylphenylamino)-pyrimidine | Do. |
| 135 | 1-amino-4-(4'-methylphenyl)-sulphonyl-amino-benzene | 26 g. 2,6-bis-β-chloroethyl-amino-4-(2'-methyl-phenylamino)-pyrimidine<br>8.5 g. 4,6-bis-β-chloroethyl-amino-2-(2'-methyl-phenylamino)-pyrimidine | Do. |
| 136 | 4-amino-azobenzene | 18.5 g. 2,6-bis-methylamino-4-(2'-methyl-phenylamino)-pyrimidine<br>5.5 g. 4,6-bis-methylamino-2-(2'-methyl-phenylamino)-pyrimidine | Scarlet |
| 137 | 4-amino-3'-chloro-2-methyl-azobenzene | 17.6 g. 2,6-bis-amino-4-(3'-methyl-phenylamino)-pyrimidine<br>3.9 g. 4,6-bis-amino-2-(3'methyl-phenylamino)-pyrimidine | Reddish orange. |
| 138 | 4-amino-4'-nitroazobenzene | 29 g. 2,6-bis-isoamylamino-4-(3'-methylphenylamino)-pyrimidine<br>6.5 g. 4,6-bis-isoamylamino-2-(3'methyl-phenylamino)-pyrimidine | Scarlet. |
| 139 | 4-amino-2-methyl-5-methoxy-azobenzene | 25.5 g. 2,6-bis-β-cyanoethylamino-4-(3'-methylphenylamino)-pyrimidine<br>6.6 g. 4,6-bis-β-cyanoethylamino-2-(3'-methylphenylamino)-pyrimidine | Do. |
| 140 | 2-amino-5-methylthiodiazole (1,3,4) | 18 g. 2,6-bis-amino-4-(4'-methylphenylamino)-pyrimidine<br>3.5 g. 4,6-bis-amino-2-(4'-methylphenylamino)-pyrimidine | Orange. |
| 141 | 5-amino-1,3-dimethyl-pyrazole | Same as above | Yellow. |
| 142 | 5-amino-1-phenyl-3-methyl-pyrazole | do | Do. |
| 143 | 4-amino-quinoline | 20.2 g. 2,6-bis-methylamino-4-(4'-methylphenylamino)-pyrimidine<br>3.8 g. 4,6-bis-methylamino-2-(4'-methylphenylamino)-pyrimidine | Scarlet. |
| 144 | 2-amino-3-nitro-5-acetyl-thiophene | Same as above | Orange. |
| 145 | 3-amino-indazole | do | Reddish yellow. |
| 146 | 3-amino-5-nitroindazole | do | Orange. |
| 147 | 3-amino-6-chloroindazole | do | Reddish yellow. |
| 148 | 6-amino-indazole | do | Yellow. |
| 149 | 2-amino-1-methyltriazole-(1,3,5) | 20.2 g. 2,6-bis-methylamino-4-(4'-methylphenylamino)-pyrimidine<br>3.8 g. 4,6-bis-methylamino-2-(4'-methylphenylamino)-pyrimidine | Do. |
| 150 | 2-amino-6-methoxybenzthiazole | Same above | Scarlet. |
| 151 | 2-amino-5-nitrothiazole | do | Red. |

Table VII—Continued

| Example No. | Diazo component | Coupling component | Shade on polyglycolterephthalate fibres |
|---|---|---|---|
| 152 | 1-amino-2-chlorobenzene | 15.2 g. 2,6-bis-amino-4-(4'-methoxy-phenylamino)-pyrimidine / 7.9 g. 4,6-bis-amino-2-(4'-methoxy-phenylamino)-pyrimidine | Yellow. |
| 153 | 2-amino-naphthalene-5-sulphonic acid-methylamide. | Same as above | Scarlet. |
| 154 | 1-amino-2,4-dinitro-6-chlorobenzene | 19 g. 2,6-bis-ethylamino-4-(4'-methoxy-phenylamino)-pyrimidine / 9.7 g. 4,6-bis-ethylamino-2-(4'-methoxy-phenylamino)-pyrimidine | Bordeaux. |
| 155 | 1-amino-2,4-dinitro-benzene | Same as above | Do. |
| 156 | 1-amino-2-nitrobenzene | 18 g. 2,6-bis-ethylamino-4-(4'-methoxy-phenylamino)-pyrimidine / 11.2 g. 4,6-bis-ethylamino-2-(4'-chlorophenylamino)-pyrimidine | Orange. |
| 157 | 1-amino-2,4-dinitro-benzene | 20.2 g. 2,6-bis-methylamino-4-(4'-methylphenylamino)-pyrimidine / 3.8 g. 4,6-bis-methylamino-2-(4'-methylphenylamino)-pyrimidine | Red. |
| 158 | 1-amino-2,4-dinitro-6-chloro-benzene | Same as above | Red. |
| 159 | 1-amino-3-nitro-4-fluoro-benzene | 22.4 g. 2,6-bis-ethylamino-4-phenylaminopyrimidine / 3.3 g. 4,6-bis-ethylamino-2-phenylaminopyrimidine | Orange. |
| 160 | 1-amino-2-nitro-benzene-4-sulfonic-acid-phenylester. | Same as above | Scarlet. |
| 161 | 1-amino-2-nitro-benzene-4-carboxylic-acid-β-hydroxyethylester. | do | Do. |
| 162 | 1-amino-2-nitro-benzene-4-sulfonic-acid-N-phenyl-N-methyl-amide. | do | Do. |
| 163 | 1-amino-2-nitro-benzene-4-sulfonic-acid-cyclohexylamide. | do | Do. |
| 164 | 1-amino-2-nitrobenzene-4-sulfonic-acid-N-benzyl-N-β-hydroxy-ethylamide. | do | Do. |
| 165 | 1-amino-2-nitrobenzene-4-carboxylic-acid-N-γ-methoxypropyl-N-methylamide. | do | Do. |
| 166 | 1-amino-2-nitrobenzene-4-carboxylic-acid-cyclohexylamide. | do | Do. |
| 167 | 1-amino-2-nitrobenzene-4-carboxylic-acid-N-benzyl-N-β-hydroxyethylamide. | do | Do. |
| 168 | 1-amino-2,4-dinitro-6-chloro-benzene | 3.3 g. 2,6-bis-ethylamino-4-phenylaminopyrimidine / 22.4 g. 4,6-bis-ethylamino-2-phenylaminopyrimidine | Red. |
| 169 | 2-amino-6-methoxy-benzothiazole | Same as above | Scarlet. |
| 170 | 1-amino-2-nitro-4-sulfamoyl-benzene | do | Do. |
| 171 | 1-amino-2-nitro-benzene-4-carboxylic-acid-β-methoxyethyl-ester. | do | Do. |
| 172 | 1-amino-2,4-dinitro-6-bromo-benzene | do | Red. |

Dyestuffs having similar properties are also obtained by coupling diazo components given in column 2 of the following Table VIII under the conditions described in Example 2 with the equimolar amount of one of the coupling components given in column 3.

TABLE VIII

| Example No. | Diazo component | Coupling component | Shade on polyglycol terephthalate fibers |
|---|---|---|---|
| 173 | 1-amino-benzene-4-carboxylic acid N-β-hydroxyethyl-N-benzyl-amide | 17.5 g. 2,6-bis-amino-4-phenylamino-pyrimidine / 2.6 g. 4,6-bis-amino-2-phenylamino-pyrimidine | Yellow. |
| 174 | 1-amino-2,4,5-trichloro-benzene | Same as above | Do. |
| 175 | 1-amino-2,4,6-tribromo-benzene | do | Do. |
| 176 | 1-amino-2,4,6-trichloro-benzene | 2.6 g. 2,6-bis-amino-4-phenylamino-pyrimidine / 17.5 g. 4,6-bis-amino-2-phenylamino-pyrimidine | Do. |
| 177 | Ethyl 1-amino-benzene-4-carboxylate | Same as above | Do. |
| 178 | 1-amino-2-chloro-4-methyl-benzene | do | Do. |
| 179 | 1-amino-2-cyano-5-methoxy-benzene | do | Do. |
| 180 | 1-amino-benzene-4-carboxylic acid β-hydroxy-ethylester | 17.5 g. 2,6-bis-amino-4-phenylamino-pyrimidine / 2.6 g. 4,6-bis-amino-2-phenylamino-pyrimidine | Do. |
| 181 | 1-amino-benzene-3 sulfonic acid N-methyl-N-β-hydroxyethyl-amide | Same as above | Do. |
| 182 | 1-amino-benzene 4-sulfonic acid-N-(γ-methoxypropyl)-amide | do | Do. |
| 183 | 1-amino-4-sulfamoyl-benzene | do | Do. |
| 184 | 1-amino-benzene-4-sulfonic acid N-cyclohexyl amide | do | Do. |
| 185 | 1-amino-benzene-2-sulfonic acid N,N-dimethylamide | do | Do. |
| 186 | 1-amino-benzene-4-sulfonic acid N-benzyl-amide | do | Do. |
| 187 | 1-amino-4-carbamoyl-benzene | do | Do. |
| 188 | 1-amino-benzene-4-carboxylic acid γ-methoxypropyl-amide | do | Do. |
| 189 | 1-amino-benzene-4-carboxylic acid N-methyl-N-phenyl-amide | do | Do. |
| 190 | 1-amino-benzene-4-carboxylic acid N-cyclohexyl amide | do | Do. |

The individual dyestuff isomers contained in the mixed dyestuffs described hereinbefore can be produced by using in lieu of the mixed pyrimidine coupling components the desired individual pyrimidines which can be obtained by the procedure described in Example 1, using analogous starting materials obtained by separating the isomer mixture obtained, e.g. by reacting 2,4,6-trichloropyrimidine and an aniline, by fractional crystallization or by chromatography.

EXAMPLE 191

Polyglycol terephthalate fabric (such as "Dacron" of E. I. du Pont de Nemours, Wilmington, Del., U.S.A.) is impregnated in a foulard at 40° with a liquor of the following composition:

20 parts by weight of the dyestuff according to Example 59, finely dispersed in
7.5 parts by weight of sodium alginate,
20 parts by weight of triethanolamine,
20 parts by weight of octylphenol polyglycol ether, and
900 parts by weight of water.

The fabric is wrung out to a liquor content of about 100% dried at 100° and the dyeing is then fixed for 30 seconds at a temperature of 210°. The dyed goods are rinsed with water, soaped and dried. Under these conditions, a scarlet dyeing is obtained which is fast to washing, rubbing, light and sublimation.

The dyestuffs described in the other examples produce dyeings of equal quality according to this process.

EXAMPLE 192

In a pressure dyeing apparatus, 2 g. of the dyestuff obtained according to Example 38 are finely suspended in 2000 g. of water containing 4 g. of oleyl polyglycol ether. The pH of the dyebath is adjusted to 5–5.5 with acetic acid.

100 g. of polyglycol terephthalate fabric are then introduced at 50°, the bath is heated to 140° within 30 minutes and dyeing is performed for 50 minutes at this temperature. The dyeing is then rinsed with water, soaped and dried. Under these conditions, a pure red dyeing is obtained which is fast to washing, perspiration, light and sublimation.

The dyestuffs described in the other examples produce dyeings of equal quality by this process.

EXAMPLE 193

2 g. of the dyestuff obtained according to Example 111 are dispersed in 4000 g. of water. 12 g. of sodium o-phenyl-phenolate are added to this dispersion as carrier and also 12 g. of diammonium phosphate are added and 100 g. of polyglycol terephthalate yarn are dyed for 1½ hours at 95–98°. The dyeing is rinsed and after-treated with dilute sodium hydroxide solution and a dispersing agent.

In this way a pure red dyeing which is fast to washing, light and sublimation is obtained.

If in the above example, the 100 g. of polyglycol terephthalate yarn are replaced by 100 g. of cellulose triacetate fabric, dyeing is performed under the conditions given and the dyeing is then rinsed with water, a red dyeing is obtained which has very good fastness to washing and sublimation.

EXAMPLE 194

Polyglycol terephthalate fabric (such as "Dacron") is impregnated in a foulard at 40° with a liquor of the following composition:

20 parts by weight of the dyestuff according to Example 113, finely dispersed in
7.5 parts by weight of sodium alginate,
20 parts by weight of triethanolamine,
20 parts by weight of octylphenol polyglycol ether, and
900 parts by weight of water.

The fabric is wrung out to a liquor content of about 100%, dried at 100° and the dyeing is then fixed for 30 seconds at a temperature of 210°. The dyed goods are rinsed with water, soaped and dried. Under these conditions, a scarlet dyeing is obtained which is fast to washing, rubbing, light and sublimation.

Example 195

(a) 93 g. of aniline are suspended in a mixture of 400 g. of water and 200 ml. of acetone, and 8 g. of anhydrous sodium acetate are added in one batch, 183.4 g. of 2,4,6-trichloro-pyrimidine dissolved in 200 ml. of acetone are then added dropwise and, while maintaining the reaction mixture at a temperature of 50–55°, 40 g. of sodium hydroxide dissolved in 160 g. of water are added at such a rate that the pH of the reaction mixture remains between 5 and 6 throughout the addition of the trichloropyrimidine. Stirring is then continued at the same temperature range for 4 hours, whereupon the acetonic phase formed is separated from the supernatant aqueous phase, and the acetonic phase is then evaporated to dryness.

The residue consists of a mixture of 85% by weight of 4 - phenylamino - 2,6 - dichloro-pyrimidine and 15% by weight of 2-phenylamino - 4,6 - dichloro-pyrimidine; it is then dissolved in 500 ml. of 80°-warm benzene, and upon cooling, 56.4 g. of the 4-phenyl-amino isomer crystallize (M.P. 135–136°).

The mother liquor is then evaporated to dryness and redissolved in 280 ml. of benzene having a temperature of 80°. Upon cooling, another 101 g. of 4-phenylamino-2,6-dichloro-pyrimidine (M.P. 135–136°) crystallize. The final mother liquor separated from the crystals, can then be used for isolating the 2-phenylamino isomer therefrom. The second batch of crystals of the 4-phenylamino isomer obtained is still sufficiently pure to be used together with the first batch in the production of azo dyestuff coupling components therefrom on an industrial scale.

(b) 48 g. of 4-phenylamino-2,6-dichloro-pyrimidine obtained from step (a) are dissolved in 100 g. of dioxan, and 160 g. of water are added to the solution; to the resulting suspension there are added 30 g. of ethylamine in 30 g. of water, the reaction mixture is then heated to 85–90° during 6 hours with stirring, and stirring is continued while the mixture cools down to room temperature. Technically, pure 4-phenylamino-2-ethylamino-6-chloro-pyrimidine having a melting point of about 90° precipitates and is separated by filtration and dried.

(c) 50 g. of this product are mixed with an excess of undiluted cyclohexyl-amine, over the stoichiometrically required amount, and the mixture is heated in a closed vessel with stirring at 140–150° for 2 hours. 4-phenylamino-2-ethylamino-6-cyclohexylamino - pyrimidine of syrupy consistency is obtained which can be used directly as coupling component in the production of dyestuffs according to the invention in lieu of the coupling components used in Examples 1 to 190, supra.

Dyeings on polyglycol terephthalate fibers with the resulting dyestuffs have similar shades and fastness properties as those obtained with the dyestuffs of the preceding examples.

Example 196

(a) The second mother liquor obtained as described under (a) in Example 195 is evaporated to dryness and a residue of 43.1 g. of crude 2-phenylamino-4,6-dichloro-pyrimidine (M.P. 90–91°) is obtained.

5 g. of this crude product are dissolved in 20 ml. of benzene and chromatographed on a 20 cm. x 5 cm. alumina column. The pure 2-phenylamino-4,6-dichloro-pyrimidine is eluted with benzene/chloroform (volume ratio 1:1) as eluting agent. It has a melting point of 111–112°.

(b) Step (b) of Example 195 is then repeated, but using 48 g. of 2-phenylamino-4,6-dichloro-pyrimidine as starting material, and, since the desired product does not precipitate, it is necessary to subject the reaction mixture to steam distillation. An orange-colored resin is obtained which is dissolved in four times its amount (about 120 ml.) of ethanol at 80°. Upon cooling, 30 g. of purified 2-phenylamino-4-ethylamino-6-chloro-pyrimidine separated by filtration and dried, and has a melting point of 103–104°.

(c) Step (c) of Example 195 is repeated with this intermediate and a syrupy product consisting of 2-phenylamino-4-ethylamino-6-cyclohexylamino - pyrimidine is obtained which is used directly as coupling component in each of the preceding Examples 1 to 190, in lieu of the coupling components used in the latter.

Dyeings on polyglycol terephthalate fibers with the resulting dyestuffs have similar shades and fastness properties as those obtained with the dyestuffs of the preceding examples.

Example 197

Step (a) of Example 195 is repeated, but in lieu of 93 g. of aniline employed therein, there are used 99 g. of cyclohexylamine; from the resulting mixture of two isomers, the 2-cyclohexylamino - 4,6 - dichloro-pyrimidine is isolated as described, and step (b) and (c) of Example 196 are then repeated but using aniline in lieu of cyclohexyl-amine in step (c).

2-cyclohexylamino - 4 - phenylamino - 6 - ethylamino-pyrimidine is obtained which can be used as coupling component in the preceding Examples 1 to 190 in lieu of the coupling components used therein.

For instance, by repeating the procedure of Example 38, but using therein as diazo component the diazonium compound from 1-amino-2,4-dinitro-6-chloro-benzene and as coupling component the above-described pyrimidine, there is obtained the dyestuff of the formula

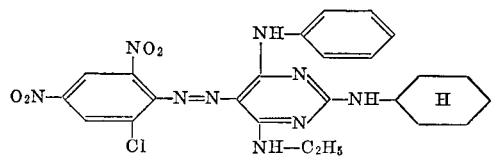

which dyes polyethyleneglycol terephthalate fibers in pure red shades of good all round fastness properties.

All individual isomers of the mixed coupling components used in Examples 1 to 190 can be produced in the manner described in Examples 195 to 197 and can be used either individually or in mixtures of two or three isomers in desired proportions, as coupling components in lieu of those employed in Examples 1 to 190, supra. The resulting dyestuffs have similar shades and dyeing properties as the dyestuffs described in the said examples.

All percentages given in the foregoing examples are by weight unless expressly stated otherwise.

We claim:

1. A dyestuff of the formula

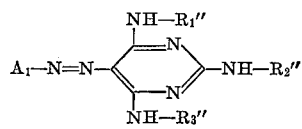

wherein $A_1$ represents a phenyl radical substituted as follows:
(i) by a first substituent selected from nitro, cyano, fluorine, chlorine, bromine, lower alkylsulfonyl, phenoxysulfonyl, lower alkylphenoxysulfonyl, lower alkoxycarbonyl, hydroxy-lower alkoxycarbonyl, or a substituent of the formula

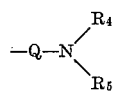

wherein Q represents —$SO_2$— or —CO—, $R_4$ represents hydrogen, lower alkyl, hydroxy-lower alkyl, lower alkoxy-lower alkyl, phenyl, cyclohexyl or benzyl; $R_5$ represents hydrogen, lower alkyl or hydroxy-lower alkyl;
(ii) by a second substituent selected from hydrogen, nitro, chlorine, bromine, lower alkyl, lower alkoxy and phenoxy; and
(iii) by a third substituent selected from hydrogen, chlorine, bromine, at least one of said first and second substituents being nitro;

one of $R_1''$ and $R_2''$ represents a phenyl radical, any substituent of which is selected from hydrogen, lower alkyl, lower alkoxy, chlorine, bromine and cyano; and the other of the last-mentioned (R'')'s as well as $R_3''$ represents hydrogen, lower alkyl, cyclohexyl or benzyl.

2. A dyestuff as defined in claim 1, wherein one of said first and second substituents is in o- or p-position to the azo bridge, and one of these two substituents is nitro.

3. A dyestuff as defined in claim 1, wherein one of $R_1''$ and $R_2''$ represents phenyl substituted by one of hydrogen, lower alkyl and lower alkoxy, and the other of the said (R'')'s as well as $R_3''$ represents hydrogen or lower alkyl.

4. A dyestuff as described in claim 1, wherein $A_1$ represents

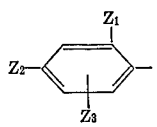

wherein
one of $Z_1$ and $Z_2$ represents nitro,
the other of these Z's represents hydrogen, nitro, chloro, cyano, bromo, lower alkyl-sulfonyl or lower alkoxycarbonyl, and
$Z_3$ represents hydrogen, chlorine or bromine.

5. A dyestuff as defined in claim 4 wherein $A_1$ represents

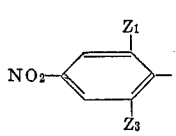

wherein
$Z_1$ represents nitro, hydrogen, chlorine, bromine or cyano,
one of $R_1''$ and $R_2''$ represents phenyl substituted by at least one of the following: hydrogen, lower alkyl, lower alkoxy, and
the other one of $R_1''$ and $R_2''$ represents lower alkyl, and
$R_3''$ represents lower alkyl.

6. A dyestuff as defined in claim 2, wherein $A_1$ represents

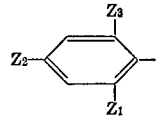

wherein
$Z_1$ represents nitro, cyano, chloro or bromo,
$Z_2$ represents nitro, chloro, bromo or alkyl-sulfonyl, and
$Z_3$ represents hydrogen, chloro or bromo.

7. A dyestuff as defined in claim 5, which is of the formula

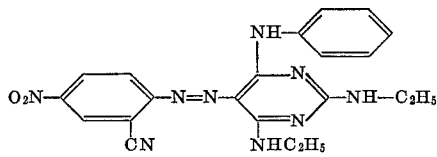

8. A dyestuff as defined in claim 5, which is of the formula

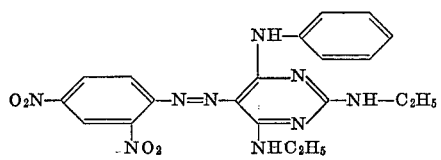

9. A dyestuff as defined in claim 5, which is of the formula

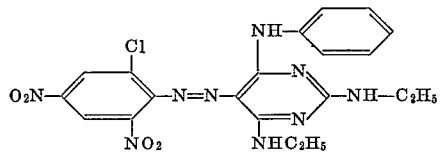

10. A dyestuff as defined in claim 4, which is of the formula

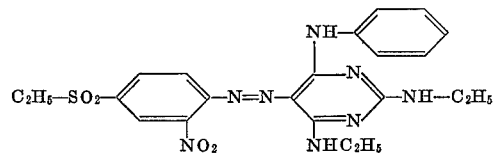

11. A dyestuff as defined in claim 4, which is a composite dyestuff consisting essentially of a mixture of the dyestuffs of the formulas

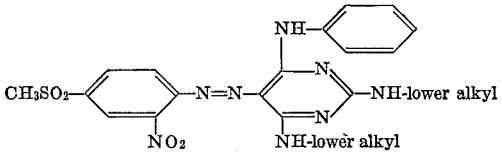

and

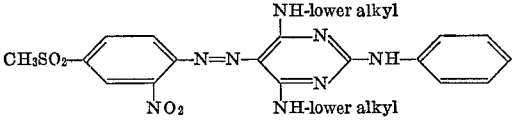

wherein the dyestuff of the second formula is present in an amount of about 5–80%, calculated on the total weight of composite dyestuff.

12. A dyestuff as defined in claim 5, which is a composite dyestuff consisting essentially of a mixture of the dyestuffs of the formulas

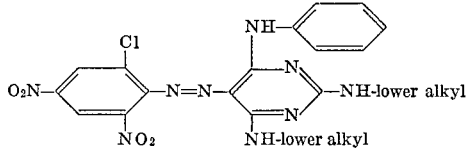

and

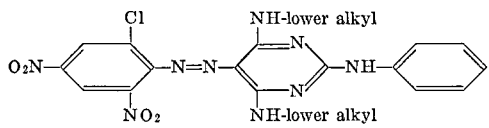

wherein the dyestuff of the second formula is present in an amount of about 5–80%, calculated on the total weight of composite dyestuff.

13. A dyestuff as defined in claim 5, which is a composite dyestuff consisting essentially of a mixture of the dyestuffs of the formulas

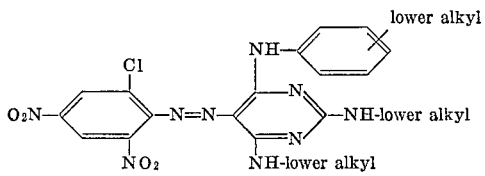

and

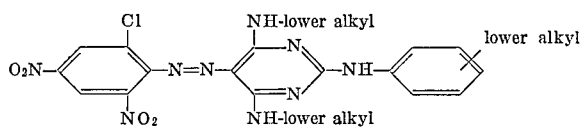

wherein the dyestuff of the second formula is present in an amount of about 5–80%, calculated on the total weight of composite dyestuff.

14. A dyestuff as defined in claim 5, which is a composite dyestuff consisting essentially of a mixture of the dyestuff of the formulas

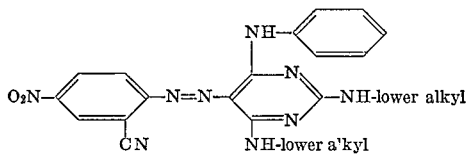

and

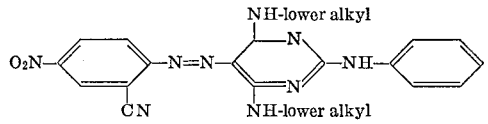

wherein the dyestuff of the second formula is present in an amount of about 5–80%, calculated on the total weight of composite dyestuff.

15. A dyestuff of the formula

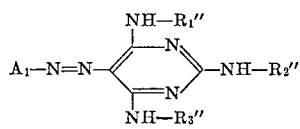

wherein $A_1$ represents a phenyl radical substituted as follows:
  (a) by a first substituent selected from cyano, fluorine, chlorine, bromine, trifluoromethyl, lower alkanoyl, benzoyl, lower alkylsulfonyl, phenylsulfonyl, lower alkylphenyl-sulfonyl, phenoxysulfonyl, lower alkylphenoxysulfonyl, lower alkoxycarbonyl, hydroxy- lower alkoxycarbonyl, lower alkoxy-lower alkoxycarbonyl, and a substituent of the formula

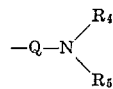

wherein Q represents —$SO_2$— or —CO—, $R_4$ represents hydrogen, lower alkyl, hydroxy-lower alkyl, lower alkoxy-lower alkyl, phenyl, cyclohexyl or benzyl, $R_5$ represents hydrogen, lower alkyl or hydroxy-lower alkyl;
  (b) by a second substituent selected from hydrogen, lower alkyl, lower alkoxy, chlorine and bromine, and
  (c) by a third substituent selected from hydrogen, chlorine and bromine;
one of $R_1''$ and $R_2''$ represents a phenyl radical, any substituents of which is selected from hydrogen, lower alkyl, lower alkoxy, chlorine, bromine and cyano; and the other of the last-mentioned ($R''$)'s as well as $R_3''$ represents hydrogen, lower alkyl, cyclohexyl or benzyl.

16. A dystuff as defined in claim 15, wherein $A_1$ represents

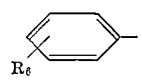

wherein $R_6$ represents cyano, fluorine, chlorine, bromine, trifluoromethyl, lower alkanoyl, benzoyl, lower alkylsulfonyl, phenylsulfonyl, lower alkylphenylsulfonyl, phenoxysulfonyl, lower alkylphenoxysulfonyl, lower alkoxycarbonyl, hydroxy-lower alkoxycarbonyl, lower alkoxy-lower alkoxycarbonyl, or a substituent of the formula

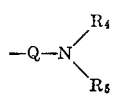

wherein Q represents —$SO_2$— or —CO—, $R_4$ represents hydrogen, lower alkyl, lower alkoxy-lower alkyl, hydroxy-lower alkyl, phenyl, cyclohexyl or benzyl; $R_5$ represents hydrogen, lower alkyl or hydroxy-lower alkyl; $R_1''$ represents

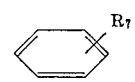

wherein $R_7$ represents hydrogen, lower alkyl or lower alkoxy, and each of $R_2''$ and $R_3''$ represents hydrogen.

17. A dyestuff as defined in claim 15, wherein $A_1$ represents 2,4-dichlorophenyl, said dyestuff being a mixture of
  (a) a compound wherein $R_1''$ represents phenyl and each of $R_2''$ and $R_3''$ represents hydrogen; and
  (b) a compound wherein $R_2''$ represents phenyl and each of $R_1''$ and $R_3''$ represents hydrogen; and the weight ratio of (a) to (b) ranges from 20:80 to 95:5.

18. A dyestuff as defined in claim 15, wherein $A_1$ represents 4-(ethoxycarbonyl)-phenyl, said dyestuff being a mixture of
  (a) a compound wherein $R_1''$ represents phenyl and each of $R_2''$ and $R_3''$ represents hydrogen; and
  (b) a compound wherein $R_2''$ represents phenyl and each of $R_1''$ and $R_3''$ represents hydrogen; and the weight ratio of (a) to (b) ranges from 20:80 to 95:5.

19. A compound of the formula

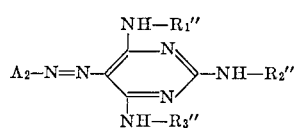

wherein
$A_2$ represents a benzothiazolyl-(2) radical which is unsubstituted or substituted by chlorine, bromine, cyano, nitro, thiocyano, lower alkyl, lower alkoxy, lower alkylsulfonyl, or a grouping

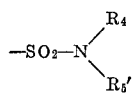

wherein each of $R_4'$ and $R_5'$ represents lower alkyl, one of $R_1''$ and $R_2''$ represents phenyl substituted as follows: hydrogen, lower alkyl, lower alkoxy, and the other of the last mentioned (R'')'s as well as $R_3''$ represents hydrogen, lower alkyl, cyclohexyl or benzyl.

20. A dyestuff as defined in claim 19, which is a composite dyestuff consisting essentially of a mixture of the dyestuffs of the formulas

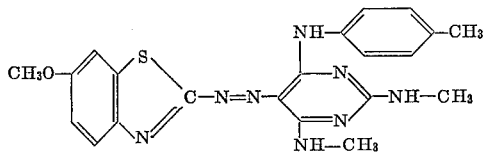

and

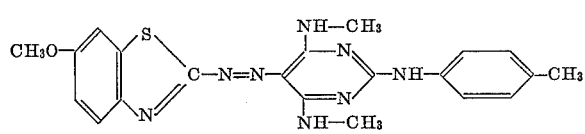

wherein the dyestuff of the second formula is present in an amount of about 5–80%, calculated on the total weight of composite dyestuff.

21. A dyestuff of the formula

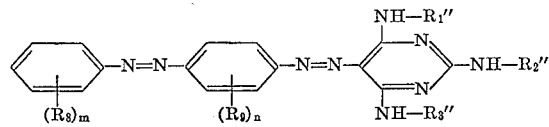

wherein:
each of $R_8$ and $R_9$ represents hydrogen, lower alkyl or lower alkoxy,
each of m and n represents a number ranging from 1 to 2,
one of $R_1''$ and $R_2''$ represents phenyl substituted by substituents selected from hydrogen, lower alkyl and lower alkoxy; and
the other one of the pair $R_1''$ and $R_2''$ as well as $R_3''$ each represents hydrogen or lower alkyl.

22. A dyestuff as defined in claim 21, which is a composite dyestuff consisting essentially of a mixture of the dyestuffs of the formulas

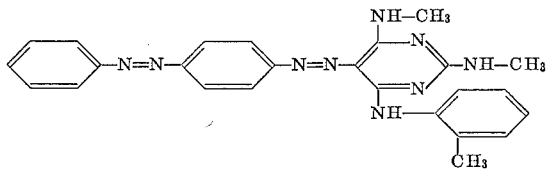

and

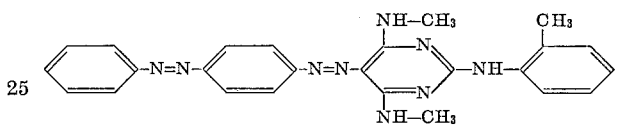

wherein the dyestuff of the second formula is present in an amount of about 5–80%, calculated on the total weight of composite dyestuff.

References Cited

UNITED STATES PATENTS 3,042,648   7/1962   Lewis et al. _____ 260—154 X

CHARLES B. PARKER, Primary Examiner

D. M. PAPUGA, Assistant Examiner

U.S. Cl. X.R.

8—26, 41, 54, 55; 260—249.6